United States Patent [19]

Gilliusson

[11] Patent Number: 4,873,840
[45] Date of Patent: Oct. 17, 1989

[54] ENERGY CO-GENERATION SYSTEM
[75] Inventor: Rolf Gilliusson, Sollentuna, Sweden
[73] Assignee: SwedSteam AB, Danderyd, Sweden
[21] Appl. No.: 155,161
[22] Filed: Feb. 11, 1988
[51] Int. Cl.[4] .............................................. F25B 27/00
[52] U.S. Cl. ................................. 62/238.6; 237/12.1; 237/13; 290/2
[58] Field of Search .................... 237/12.1, 13, 2 B; 62/238.3, 238.6; 60/648; 290/2; 165/61

[56] References Cited

U.S. PATENT DOCUMENTS

| 1,938,366 | 12/1933 | Armacost | 60/49 |
|---|---|---|---|
| 2,667,766 | 2/1954 | Cummings | 62/238.3 |
| 3,008,297 | 11/1961 | Plimpton, Jr. | 60/108 |
| 3,488,961 | 1/1970 | Gerber | 60/105 |
| 3,937,023 | 2/1976 | Williamson | 60/670 |
| 4,006,857 | 2/1977 | Adrian | 237/2 B |
| 4,093,868 | 6/1978 | Manning | 290/2 |
| 4,143,515 | 3/1979 | Johnsen | 60/648 |
| 4,170,879 | 10/1979 | Laing et al. | 237/13 |
| 4,295,606 | 10/1981 | Swenson | 237/12.1 |
| 4,414,813 | 11/1983 | Knapp | 60/655 |
| 4,438,340 | 3/1984 | Armiger | 290/2 |
| 4,475,343 | 10/1984 | Dibelius et al. | 60/648 |
| 4,510,756 | 4/1985 | Hise et al. | 60/659 |
| 4,690,102 | 9/1987 | Sundquist | 237/8 R |

Primary Examiner—Henry A. Bennet
Attorney, Agent, or Firm—Michael, Best & Friedrich

[57] ABSTRACT

A co-generation system for producing electricity, heating and cooling and including a combustion unit, a boiler connected to the combustion unit, a steam engine and an electrical generator driven to the steam engine. A condenser is connected to the steam exhaust port of the steam engine, the condenser supplying heat to a heat system and causing condensation of the steam discharged by the exhaust port. An absorption cooler is connected to the exhaust port of the steam engine, the absorption cooler for cooling fluid of a cooling system. A heat pump or centrifugal cooler can also be driven by the output shaft of the steam engine. The co-generation system can also include a flue gas cooler for further transfer of heat to heating system.

19 Claims, 2 Drawing Sheets

ENERGY CO-GENERATION SYSTEM

FIELD OF THE INVENTION

The present invention relates to steam engines and more particularly to apparatus for use in co-generation of electricity, heating and cooling, the co-generation system including a steam engine.

BACKGROUND PRIOR ART

Examples of electrical generation power plants including steam driven turbines and having means for using exhaust steam for production of heat are well known and are illustrated in the Gerber U.S. Pat. No. 3,488,961, issued Jan. 13, 1970; the Swenson U.S. Pat. No. 4,295,606, issued Oct. 20, 1981 the U.S. Pat. No. 4,414,813, issued Nov. 15, 1983; and the Armacost U.S. Pat. No. 1,938,366, issued Dec. 5, 1933. Such electrical power and heat generating plants normally require large construction costs and are used for producing large quantities of heat and power.

Attention is also directed to the Deibelius et al. U.S. Pat. No. 4,475,343, issued Oct. 9, 1984; the Johnsen U.S. Pat. No. 4,143,515, issued Mar. 13, 1979; the Williamson U.S. Pat. No. 3,937,023, issued Feb. 10, 1976; the Adrian U.S. Pat. No. 4,006,857, issued Feb. 8, 1977; the Manning U.S. Pat. No. 4,093,868, issued June 6, 1978. Attention is also directed to the Armiger U.S. Pat. No. 4,438,340, issued Mar. 20, 1984: the Plimpton U.S. Pat. No. 3,008,297, issued Nov. 14, 1961 and the Hise U.S. Pat. No. 4,510,756, issued Apr. 16, 1985.

SUMMARY OF THE INVENTION

The present invention comprises a apparatus for providing a flexible supply of heating and cooling energy as well as electric power and employs a steam engine coupled to a combustion unit adapted to use low grade sources of energy such as biomass, wastewood Products and other forms of waste materials usable as fuel. The co-generation system embodying the invention is particularly applicable to supply heating, cooling and electricity to industrial uses, hospitals, schools, office buildings and small communities. In one embodiment of the invention the apparatus includes a steam engine of the type adapted to have 100 to 1000 kWh shaft power output and with an engine speed of approximately 1000 rpm. The steam engine is operably connected to the combustion unit and to a boiler fired by the combustion unit. A condenser/heat exchanger is operably connected to the steam exhaust port of the steam engine, and the condenser/heat exchanger functions as a means for supplying heat to a hot water heating system of a building or for use in other industrial applications. The steam engine power shaft is operably connected to an electrical generator for use in producing electricity. In one embodiment of the invention the apparatus further includes an absorption cooler selectively connected to the exhaust port of the steam engine, the absorption cooler including a means for cooling fluid of a cooling system.

In one embodiment the co-generation system further includes a valve between the exhaust port of the steam engine and the condenser and the absorption cooler, the valve including means for selectively controlling flow of exhaust steam to the condenser and the absorption cooler.

In one embodiment the co-generation system of the invention includes a combustion unit, a boiler connected to the combustion unit and adapted to produce steam, a steam engine including a steam inlet port, an output shaft and a steam exhaust port, means for supplying steam from the boiler to the steam engine, an electrical generator connected to the steam engine so as to be driven by the steam engine for the production of electricity, a condenser connected to the exhaust port of the steam engine and for supplying heat to a heat system and the condenser also functioning as a means for causing condensation of the steam discharged by the exhaust port, and a heat pump driven by the steam engine, the heat pump including means for drawing heat from a source of water and for supplying heat to the system. In this embodiment of the invention the co-generation system can also include an absorption cooler selectively operably connected to the steam exhaust port of the steam engine, the absorption cooler including means for cooling fluid of a cooling system.

In one embodiment of the invention the co-generation system includes a combustion unit, a boiler connected to the combustion unit and adapted to produce steam, a steam engine including a steam inlet port, a output shaft and a steam exhaust port, means for supplying steam from the boiler to the steam engine, an electrical generator connected to the steam engine so as to be selectively driven by the steam engine for the production of electricity, a condenser connected to the exhaust port of the steam engine, the condenser including means for supplying heat to a heat system and means for causing condensation of the steam discharged by the exhaust port, and a centrifugal cooler selectively operably connected to the steam engine so as to be selectively driven by the steam engine.

In one embodiment of the invention the steam engine includes a rotationally driven output shaft having opposite ends, one end selectively coupled to the electrical generator for driving the electrical generator and the other end selectively coupled to the centrifugal cooler for selectively driving the centrifugal cooler.

In one embodiment of the invention an absorption cooler is connected to the exhaust port of the steam engine, the absorption cooler means including means for cooling fluid of a cooling system.

In one embodiment of the invention the centrifugal cooler is operably connected to the cooling system and includes means for cooling fluid of the cooling system, and the centrifugal cooler and the absorption cooler are operably connected in series to the cooling system.

In one embodiment of the invention the co-generation system includes a combustion unit, a boiler connected to the combustion unit and adapted to produce steam, a steam engine including a steam inlet port, an output shaft and a steam exhaust port, means for supplying steam from the boiler to the steam engine, an electrical generator driven by the steam engine for the production of electricity, and a distiller operably connected to the exhaust port of the steam engine, the distiller being operably connected to a source of salt water, and the distiller including means for causing the heat of the steam discharged from the exhaust port of the steam engine to cause evaporation of the salt water supplied to the distiller and production of fresh water.

Various other features and advantages of the invention will be apparent by reference to the following description of a preferred embodiment, from the drawings and from the claims.

Figure 1:
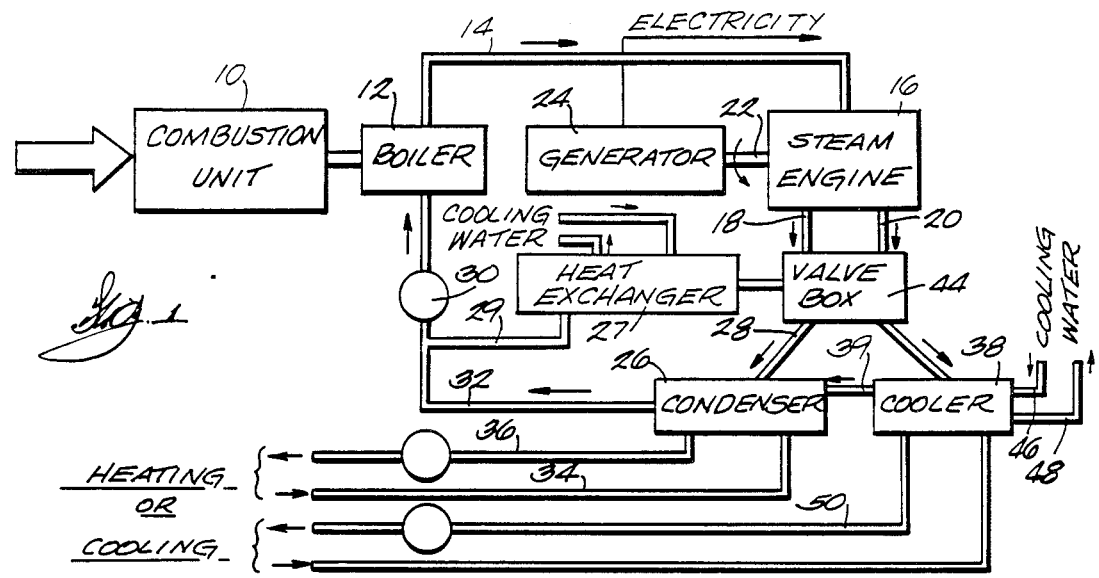
FIG. 1 is a schematic view of a co-generation system embodying the invention.

Before describing at least one embodiment of the invention in detail, it is to be understood that the invention is not limited in its application to the details of construction and to the specific arrangement set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

A co-generation system embodying the invention is illustrated in FIG. 1 and is shown there as including a combustion unit 10 of the type adapted to burn waste wood products, waste agricultural products, solid organic refuse or other inexpensive organic materials. While the combustion unit could have other constructions, in the illustrated arrangement, in one preferred form of the invention, the combustion unit can be constructed as illustrated in U.S. Pat. No. 4,543,890, issued Oct. 1, 1985 and titled Wood Fuel Combustion System. The combustion unit 10 supplies heat to a boiler 12 for producing superheated steam. The steam generated by the boiler 12 is supplied through a steam line 14 to a steam engine 16. While the steam engine 16 could have other constructions, in one preferred form of the invention, the steam engine can have a configuration as described in applicant's co-pending U.S. patent application Ser. No. 103,592 filed Oct. 1, 1987 and titled Steam Engine. In a preferred form of the invention, the steam engine 16 will be a two cylinder engine having two steam exhaust ports 18 and 20 and also having a rotationally driven power take-off shaft 22. While in the illustrated arrangement the steam engine 16 is described as being a two cylinder engine having two exhaust ports, in other applications the steam engine could have a single cylinder. An electrical generator 24 is operably connected to the end 22 of the power take-off shaft so as to be driven by the steam engine 16.

The co-generation system also includes a condenser 26 operably connected to at least one of the steam exhaust ports 18 and 20 of the steam engine 16 by a steam line 28 to cause condensation of the steam and return of fresh water to a holding tank 30 and then to the boiler 12 through water line 32. Water from a heating system of a building or from a hot water system used in an industrial or processing system can also be directed through the condenser through line 34 to provide heat to the water of that heating system through line 36. While in the illustrated arrangement the condenser 26 is described as providing heat to a hot water heating system or the like, it will be understood that the condenser can be used to provide hot water for use in a large number of alternative applications.

In the embodiment of the invention shown in FIG. 1, the apparatus further includes an absorption cooler 38 operably connected to at least one of the steam exhaust outlet ports 18 and 20 of the steam engine 16. The absorption cooler 38 is also connected by line 39 to water return line 32 such that condensate from the absorption cooler can be returned to the boiler. A valve box 44 is provided between the exhaust ports 18 and 20 of the steam engine 16, the condenser 26, and the absorption cooler 38 to selectively and alternatively provide exhaust steam to the condenser 26 and/or the absorption cooler 38. The absorption cooler 38 is connected by lines 46 and 48 to a source of cooling water such as a mine, well, lake, river, etc. In operation of the system illustrated in FIG. 1, the absorption cooler 38 can supply cold water to the line 50 of the cooling system at temperatures as low as 43° F. In practice this cooling water can be used to operate a building air conditioning system or be used in other commercial or industrial applications where cooling is required.

In the arrangement shown in FIG. 1 the cogeneration system also includes a second condenser or heat exchanger 27 for dumping heat from the exhaust steam when heating or cooling is not required. The valve box 44 also functions to selectively direct exhaust steam to the heat exchanger 27 when heating and cooling is not required. Condensate from heat exchanger 27 is returned to the boiler make-up water through line 29.

In commercial practice the co-generation system described above can be employed as a heating system in the winter months and a cooling system in the summer months so as to provide a nearly constant use of the co-generation system for either cooling or heating. Additionally, the system supplies a constant source of electricity for applications in the buildings being provided with heat or for other residential or commercial applications.

Figure 2:
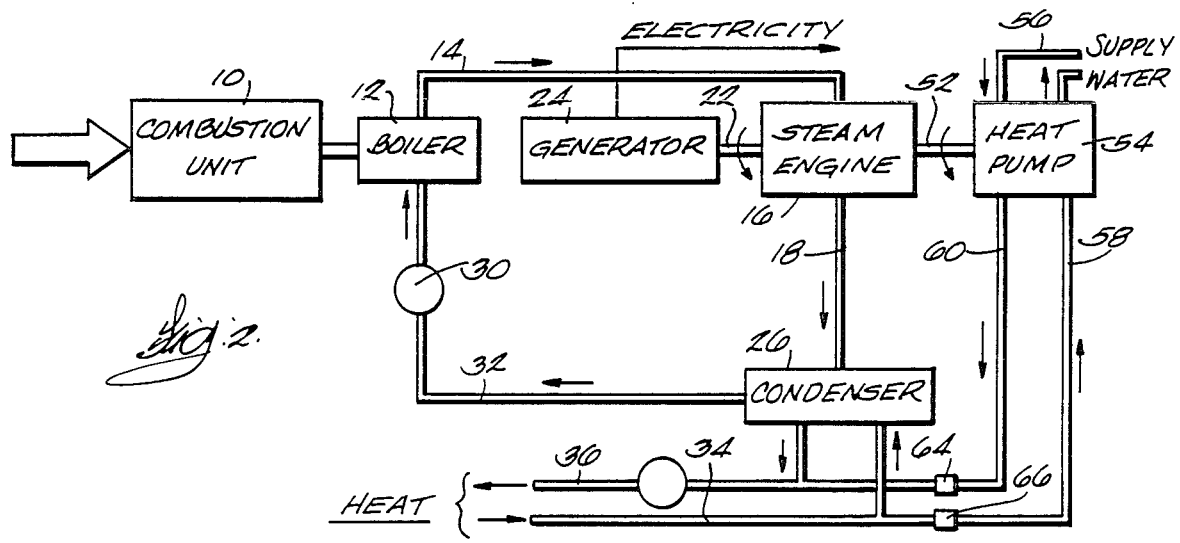
FIG. 2 is a schematic view of a co-generation system comprising an alternative embodiment of the invention.

Illustrated in FIG. 2 is an alternative embodiment of the co-generation system shown in FIG. 1 and wherein the output shaft of the steam engine has one end 22 operably coupled to the electrical generator and the opposite end 52 of the output shaft is operably coupled to a heat pump 54 to drive the heat pump 54. The heat pump draws water through line 56 from an ambient water source such as ground water, a lake or mine and uses heat from that water source to supply heat to water of a heating system. Water from the heating system is supplied to the heat pump 54 through line 58, and heated water is delivered to the heating system through line 60. In one form of the invention, the heat pump can generate up to 4 MW of heat when driven by a 1 MW steam engine. A condenser 26 is also operably connected to the exhaust port 18 of the steam engine, and water from the heating system flows through the condenser 26. The water from the heating system is heated in the condenser 26 and causes condensation of the steam wherein it can be returned to a collection tank 30 and the boiler 12. In the arrangement shown in FIG. 2, valves 64 and 66 are also provided to control flow of water between the heating system and the heat pump 54. If the heat from the condenser 26 is added to the heat from the heat pump 54, the system may generate up to 9 MW of heat if driven by a 1 MW steam engine.

Figure 3:
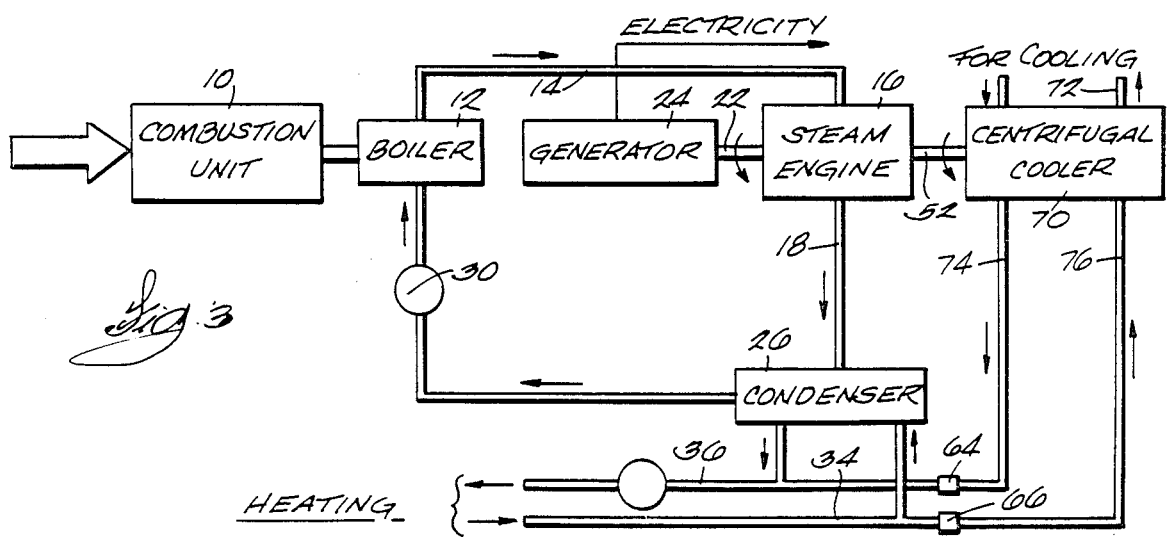
FIG. 3 is a schematic view of a co-generation system comprising another alternative embodiment of the invention.

Illustrated in FIG. 3 is another embodiment of the co-generation system illustrated in FIGS. 1 and 2, and wherein the output shaft of the steam engine drives an electrical generator 24 and a centrifugal cooler 70. In one application of the co-generation system shown in FIG. 3, the centrifugal cooler 70 can supply a coolant through a line 72 for operation of an industrial refrigeration system or for operation of an air conditioning system. The centrifugal cooler is also operably connected to the heating system through lines 74 and 76.

Figure 4:
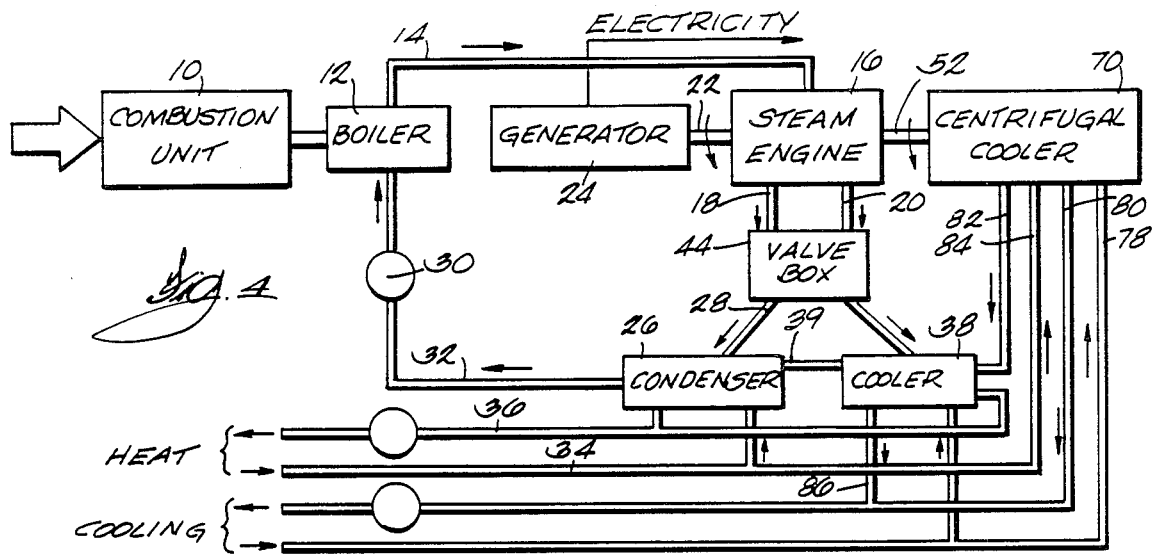
FIG. 4 is a schematic view of a co-generation system comprising another alternative embodiment of the invention.

Another alternative embodiment of the invention is illustrated in FIG. 4 and wherein the co-generation system includes in combination an absorption cooler 38 selectively operably connected through a valve box 44 to at least one exhaust port 20 of the steam engine 16 and a centrifugal cooler 70 operably coupled to an end 52 of the output shaft of the steam engine 16 so as to be driven by the steam engine. The centrifugal cooler 70 is operably connected through lines 78 and 80 to water pipes of an air conditioning system and for supplying cool water to the air conditioning system. The centrifugal cooler is also operably connected through line 82 to the absorption cooler 38 to provide cold water to the absorption cooler, the absorption cooler also functioning to supply cooled water through line 86 to the cold water lines of an air conditioning system. In operation of a system of the type shown in FIG. 4, if a 1 MW steam engine is employed, the system can generate up to 6.5 MW of cooling for air conditioning. Additionally, if the warm water discharge pipes of the centrifugal cooler and the absorption cooler are connected in series, the system can further generate up to an additional 12.5 MW of lower grade heat (up to about 125° F.). Such hot water can be used as hot tap water in residential buildings, hotels, etc.

Figure 5:
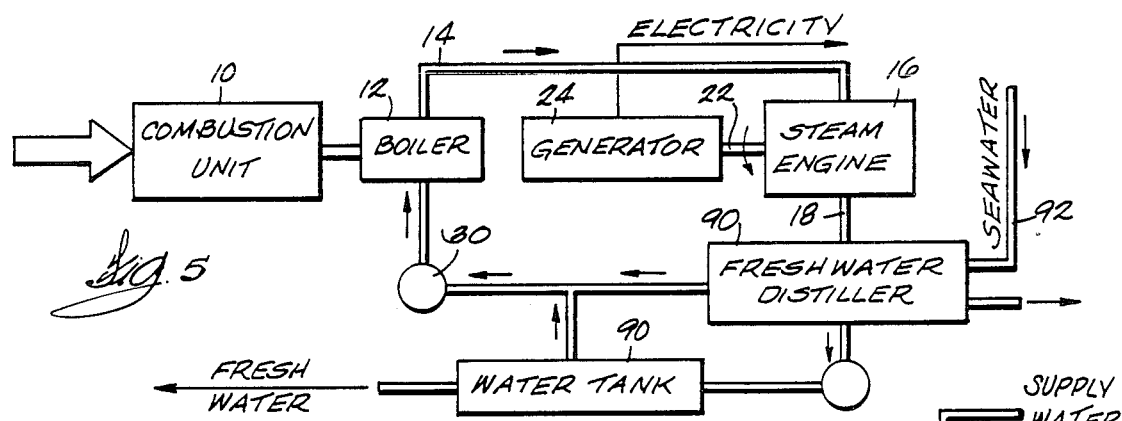
FIG. 5 is a schematic view of a co-generation system comprising another alternative embodiment of the invention.

FIG. 5 illustrates another alternative embodiment of the invention wherein a fresh water distiller 90 is operably connected to the steam exhaust port 18 of the steam engine. Salt water is supplied to the fresh water distiller through a line 92, and heat from the exhaust steam can provide for evaporation of salt water and production of fresh water. The fresh water is supplied to a tank 94. A portion of that water is returned to the boiler 12. The fresh water distiller also functions as a condenser for reduction of steam from the steam engine to fresh water. In operation of this apparatus employing a 1 MW steam engine, the distiller will convert sea water of salinity 35,000 ppm into fresh water of 1.5 ppm at a rate of up to 160 tons per day.

Figure 6:
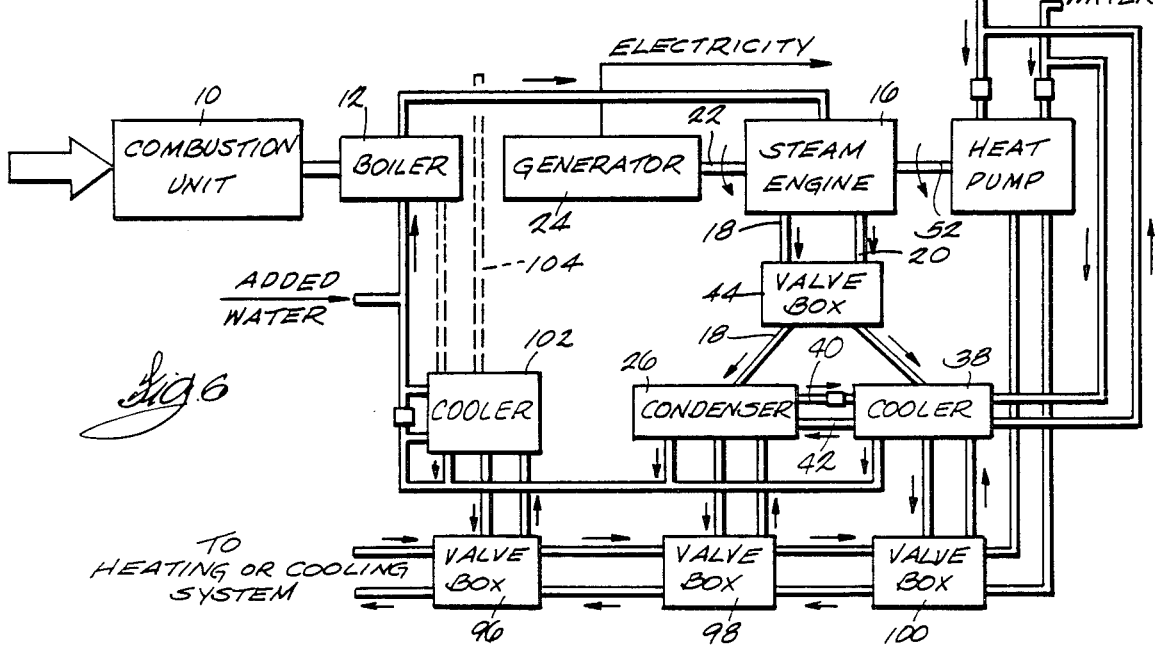
FIG. 6 is a schematic view of a co-generation system comprising another alternative embodiment of the invention.

Illustrated in FIG. 6 is another alternative embodiment of a co-generation system embodying the invention and wherein the steam engine drives both an electrical generator and a heat pump. The heat pump is used in combination with an absorption cooler and a condenser to provide heating and cooling to water of a heating and cooling system. Valve boxes 96, 98 and 100 are provided for selectively connecting the heat pump, absorption cooler, condenser and combinations of these to the heating and cooling systems. The supply water can also be shunted through lines 40 and 42 directly to the condenser 26.

In construction of a co-generation system embodying the invention, the size of the system and the selection of the component equipment and functions are dependent on the climate conditions and the requirements of the building or industrial application. Normally the demand for heating and cooling will dictate the size of the co-generation system needed, while the electrical production will be a by-product.

In the arrangement illustrated in FIG. 6, a flue gas cooler 102 is also included for minimizing the boiler losses and for generation of heat to the heating system and/or for preheating the feed water supplied to the boiler.

In operation of the co-generation system shown in FIG. 6, the system can generate energy in the following combinations to meet the seasonal demand variations. During the cold winter months, heat is produced from the condenser, heat pump and flue gas cooler. The total efficiency of the co-generation system can be 114%. No electricity is generated. During periods of less extreme cold, the heat pump is disconnected, heat from the condenser and flue gas cooler is supplied to the heating system. Electricity is generated by the steam engine driven generator. Total efficiency of this combination can be 90%. During periods of mild winter weather, heat is supplied to the heating system from the condenser and electricity is produced by the generator. Heat is also produced by the flue gas cooler.

During spring and autumn months wherein neither heating or cooling is demanded, electricity is produced by the steam engine driven generator. During summer months requiring moderate cooling, cooling can be produced by the heat pump and no electricity is generated. The total operating efficiency of the system can be 40%. During warm summer periods, cooling can be provided by the absorption cooler and electricity is generated by the generator. The total efficiency of the system can be 57%. During hot summer months cooling can be provided by both the absorption cooler and the heat pump, no electricity is generated. The total system efficiency can be 72%.

In other apPlications of the system, the co-generation system can be used to generate cooling continuously for supply to a cold storage unit or for other industrial applications, and at the same time produce electricity and low value heat.

OPERATION EXAMPLE

A one year operation cycle of a co-generation system used in a Scandinavian climate and wherein the system included a 250 kWh steam engine, a flue gas cooler, an absorption cooler and a heat pump is illustrated below. The system is operated 700 hours per month using air-dry chunk wood as fuel, the energy content of the fuel being 13.5 GJ per ton.

---

1. December–February (3 months)
The whole plant is used for generation of heat by operating the condenser and the heat pump together. The steam engine shaft power efficiency is 14%. The heat pump system generates thermal energy equivalent to three time the input pump shaft power.

$$\text{Input of energy} = \frac{250}{0.14} \times 700 \times 3 = 3{,}750{,}000 \text{ kWh}$$

Wood needed $= \frac{3,750,000}{13.5 \times 278} = 1,000$ tons

Heat from heat pump $= 250 \times 3 \times 700 \times 3 = 1,575,000$ kWh
Heat from condenser $= 0.67 \times 3,750,000 = 2,512,500$ kWh
Total heat produced $= 4,087,500$ kWh Total plant efficiency $= \frac{4,087,500}{3,750,000} \times 100 = 109\%$ During this period, the plant is generating about 2 MW of heat 2. October-November and March-April (4 months) The plant generates heat from the condenser and electricity from the generator. The heat pump is disconnected. The electricity generation efficiency is 13%.

Input of energy $= \frac{250}{0.13} \times 700 \times 4 = 5,384,000$ kWh

Wood needed $= \frac{5,384,600}{13.5 \times 278} = 1.435$ tons

Heat production $= 0.68 \times 5,384,600 = 3,661,500$ kWh
Electricity production $= 250 \times 700 \times 4 = 700,000$ kWh Total plant efficiency $= \frac{3,661,500 + 700,000}{5,384,600} \times 100 = 81\%$.

3. September and May (2 months)
The plant generates only electricity, while the condenser heat is dumped. The electricity generation efficiency is 18%.

Input of energy $= \frac{250}{0.18} \times 700 \times 2 = 1,944,000$ kWh

Wood needed $= \frac{1,944,500}{13.5 \times 278} = 520$ tons

Electricity production $= 250 \times 700 \times 2 = 350,000$ kWh

Total plant efficiency $= \frac{350,000}{1,944,400} \times 100 = 18\%$

4. June-August (3 months)
The whole plant is now used for generation of cooling by operating the cooler and the heat pump together. The cooler efficiency is 65%. The heat pump system generates cooling energy equivalent to twice the input shaft power.

Input of energy $= \frac{250}{0.14} \times 700 \times 3 = 3,750,000$ kWh

Wood needed $= \frac{3,750,000}{13.5 \times 278} = 1,000$ tons

Cooling from cooler $= 0.67 \times 0.65 \times 3,750,000 = 1,633,100$ kWh
Cooling from heat pump $= 250 \times 2 \times 700 \times 3 = 1,050,000$ kWh
Total cooling produced $= 2,683,100$ kWh Total plant efficiency $= \frac{1,633,100 + 1,050,000}{3,750,000} \times 100 = 72\%$ During this period, the plant is generating about 1.3 MW of cooling.

A summary of the input and the output energy in the system is shown below:

| Period | Input, kWh | Output, kWh Heating | Cooling | Electricity | Total | Efficiency % |
|---|---|---|---|---|---|---|
| 1 | 3,750,000 | 4,087,500 | — | — | 4,0875,00 | 109 |
| 2 | 5,384,600 | 3,661,500 | — | 700,000 | 4,361,500 | 81 |
| 3 | 1,944,400 | — | — | 350,000 | 350,000 | 18 |
| 4 | 3,750,000 | — | 2,683,100 | — | 2,683,100 | 72 |

| -continued | | | | | |
|---|---|---|---|---|---|
| Total | 14,829,000 | 4,749,000 | 2,683,100 | 1,050,000 | 11,482,100 | 77 |

The total fuelwood consumption is 3,995 tons or $\frac{3,995}{365} = 10.9$ tons/day 4. Economy
The economy of the operation example is calculated below:

| | |
|---|---|
| Investment, per kWh (el.) | US$ 4,000 |
| , total | US$ 1,000,000 |
| Interest rate | 12% |
| Life span | 20 years |
| Salary level | US$ 30,000/man-year |
| Maintenance costs | 2% of investment/year |
| Fuelwood costs | US$ 25/ton |
| Sales prices, heating | US$ 0.04/kWh |
| , cooling | 0.06 |
| , electricity | 0.08 |
| Annual costs | |
| Capital costs (annuity) | US$ 135,000 |
| Maintenance | 20,000 |
| Plant operators | 45,000 |
| Fuelwood | 99,000 |
| Total | US$ 299,000 |

Per kWh energy output = 299,000 = US$ 0.026

Per kWh energy output = $\frac{299,000}{11,482,100}$ = US$ 0.026

Income from Sales

| | | |
|---|---|---|
| Heating | 7,749,000 × 0.04 | US$ 310,000 |
| Cooling | 2,683,100 × 0.06 | 161,000 |
| Electricity | 1,050,000 × 0.08 | 84,000 |
| Total | | US$ 555,000 |

Annual Profit
US$ 555,000 − 299,000 = US$ 256,000
Pay back Time $1,000,000 + \frac{12}{100} \times \frac{1,000,000}{2} \, x = (555,000 - 164,000) \, x$ x = 3.0 years

I claim:

1. A co-generation system for producing electricity, heating and cooling, the co-generation system comprising:
   a combustion unit;
   a boiler operably connected to the combustion unit and adapted to produce steam;
   steam engine including at least one cylinder having a steam inlet port and a steam exhaust port, an output shaft, and a reciprocating piston housed in the cylinder and connected to the output shaft for rotatably driving the output shaft;
   means for supplying steam from the boiler to the steam inlet port of the steam engine;
   an electrical generator selectively operably connected to the output shaft of the steam engine so as to be selectively driven by the steam engine for the production of electricity;
   condenser means selectively operably connected to the exhaust port of the steam engine, the condenser means including means for supplying heat to a heat system and means for causing condensation of the steam discharged by the exhaust port; and
   an absorption cooler means selectively operably connected to the exhaust port of the steam engine, the absorption cooler means including means for cooling fluid of a cooling system.

2. A co-generation system as set forth in claim 1 and further including valve means between the exhaust port of the steam engine and the condenser means and the absorption cooler means, the valve means including means for selectively controlling flow of exhaust steam from the steam exhaust port to the condenser means and the absorption cooler means.

3. A co-generation system as set forth in claim 1 and further including shunt means providing for heat transfer between said condenser means and said absorption cooler means.

4. A co-generation system as set forth in claim 1 wherein said steam engine includes at least two exhaust steam ports, wherein said condenser means is selectively operably connected to one of said exhaust steam ports whereby steam is selectively provided to said condenser means and wherein said absorption cooler means is operably connected to the other of said exhaust steam ports whereby steam is selectively provided to said absorption cooler means.

5. A co-generation system for producing electricity, heating and cooling, the co-generation system comprising:
   a combustion unit;
   a boiler operably connected to the combustion unit and adapted to produce steam;
   steam engine including at least one cylinder having a steam inlet port and a steam exhaust port, an output shaft, and a reciprocating piston housed in the cylinder and connected to the output shaft for rotatably driving the output shaft;
   means for supplying steam from the boiler to the steam inlet port of the steam engine;

an electrical generator selectively operably connected to the output shaft of the steam engine so as to be selectively driven by the steam engine for the production of electricity;

condenser means operably connected to the exhaust port of the steam engine, the condenser means including means for supplying heat to a heat system and means for causing condensation of the steam discharged by the exhaust port; and heat pump means selectively operably connected to the steam engine so as to be driven by the steam engine.

6. A co-generation system as set forth in claim 5 wherein said heat pump means includes means for drawing heat from a source of water and for supplying heat to the heat system.

7. A co-generation system as set forth in claim 6 wherein said steam engine includes a rotationally driven output shaft having opposite ends, one of the opposite ends of the output shaft being selectively coupled to the electrical generator for selectively driving the electrical generator and the other of the opposite ends of the output shaft being selectively coupled to the heat pump means for selectively driving the heat pump means.

8. A co-generation system as set forth in claim 5 and further including an absorption cooler means selectively operably connected to the exhaust port of the steam engine, the absorption cooler means including means for cooling fluid of a cooling system.

9. A co-generation system as set forth in claim 8 and further including valve means between the exhaust port of the steam engine and the condenser means and the absorption cooler means, the valve means including means for selectively controlling flow of exhaust steam from the exhaust port to the condenser means and the absorption cooler means.

10. A co-generation system as set forth in claim 8 and further including shunt means Providing for heat transfer between said condenser and said absorption cooler means.

11. A co-generation system as set forth in claim 8 wherein said steam engine includes at least two exhaust steam ports, wherein said condenser means is selectively operably connected to one of said exhaust ports whereby steam is selectively provided to said condenser means and wherein said absorption cooler means is operably connected to the other of said exhaust ports whereby steam is selectively provided to said absorption cooler means.

12. A co-generation system for producing electricity, heating and cooling, the co-generation system comprising;

a combustion unit;

a boiler operably connected to the combustion unit and adapted to produce steam;

steam engine including at least one cylinder having a steam inlet port and a steam exhaust port, an output shaft, and a reciprocating piston housed in the cylinder and connected to the output shaft for rotatably driving the output shaft;

means for supplying steam from the boiler to the steam inlet port of the steam engine;

an electrical generator selectively operably connected to the output shaft of the steam engine so as to be selectively driven by the steam engine for the production of electricity;

condenser means operably connected to the exhaust port of the steam engine, the condenser means including means for supplying heat to a heat system and means for causing condensation of the steam discharged by the exhaust port; and a centrifugal cooler means selectively operably connected to the steam engine so as to be selectively operably driven by the steam engine.

13. A co-generation system as set forth in claim 12 wherein said steam engine includes a rotationally driven output shaft having opposite ends, one of the opposite ends of the output shaft being selectively coupled to the electrical generator for selectively driving the electrical generator and the other of the opposite ends of the output shaft being selectively coupled to the centrifugal cooler means for selectively driving the centrifugal cooler means.

14. A co-generation system as set forth in claim 12 and further including an absorption cooler means selectively operably connected to the exhaust port of the steam engine, the absorption cooler means including means for cooling fluid of a cooling system.

15. A co-generation system as set forth in claim 14 wherein the centrifugal cooler is operably connected to the cooling system and includes means for cooling fluid of the cooling system.

16. A co-generation system as set forth in claim 15 wherein the centrifugal cooler and the absorption cooler means are operably connected to the cooling system.

17. A co-generation system as set forth in claim 14 and further including valve means between the exhaust port of the steam engine and the condenser means and the absorption cooler means, the valve means including means for selectively controlling flow of exhaust steam to the condenser means and the absorption cooler means.

18. A co-generation system as set forth in claim 14 and further including shunt means providing for heat transfer between said condenser means and said absorption cooler means.

19. A co-generation system as set forth in claim 14 wherein said steam engine includes at least two exhaust steam ports, wherein said condenser means is selectively operably connected to one of said exhaust ports whereby steam is selectively provided to said condenser and wherein said absorption cooler means is operably connected to the other of said exhaust ports whereby steam is selectively provided to said absorption cooler.

* * * * *